United States Patent
Park (10) Patent No.: US 12,463,260 B2
(45) Date of Patent: Nov. 4, 2025

(54) WIRELESS BATTERY MANAGEMENT SYSTEM, WIRELESS BATTERY MANAGEMENT METHOD AND ELECTRIC VEHICLE

(71) Applicant: LG ENERGY SOLUTION, LTD., Seoul (KR)

(72) Inventor: Chan-Ha Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 785 days.

(21) Appl. No.: 17/438,291

(22) PCT Filed: Nov. 12, 2020

(86) PCT No.: PCT/KR2020/015892
§ 371 (c)(1),
(2) Date: Jun. 30, 2022

(87) PCT Pub. No.: WO2021/096250
PCT Pub. Date: May 20, 2021

(65) Prior Publication Data
US 2022/0352563 A1 Nov. 3, 2022

(30) Foreign Application Priority Data
Nov. 14, 2019 (KR) .................. 10-2019-0146126

(51) Int. Cl.
*H01M 10/42* (2006.01)
*B60L 58/18* (2019.01)

(52) U.S. Cl.
CPC ... *H01M 10/4257* (2013.01); *H01M 10/4207* (2013.01); *B60L 58/18* (2019.02);
(Continued)

(58) Field of Classification Search
CPC . B60L 58/18; H01M 10/4207; H01M 10/425; H01M 10/4257;
(Continued)

(56) References Cited

U.S. PATENT DOCUMENTS 9,505,396 B2 11/2016 Brochhaus
9,564,762 B2 2/2017 Lee et al.
(Continued)

FOREIGN PATENT DOCUMENTS

JP 2014-20861 A 2/2014
JP 5466586 B2 4/2014
(Continued)

OTHER PUBLICATIONS

Chapter I issued in corresponding International Patent Application No. PCT/KR2020/015892 mailed on Feb. 22, 2021. (Year: 2021).*
(Continued)

*Primary Examiner* — Nader Bolourchi
(74) *Attorney, Agent, or Firm* — Morgan, Lewis & Bockius LLP (57) ABSTRACT

A wireless battery management system according to the present disclosure includes a master to wirelessly transmit a main command packet every reference time, and a plurality of slaves. Each slave wirelessly transmits a response packet including an ID of each slave when receiving the main command packet. The master classifies, as a first group, each slave to which the ID included in each response packet received within a threshold time from a time point at which the main command packet was transmitted is allocated, and each of the remaining slaves as a second group. Each slave initializes a time count of a watchdog timer provided in each slave when receiving the main command packet. Each slave
(Continued)

is reset by the watchdog timer when the time count of the watchdog timer reaches a timeout that is equal to or less than the reference time.

10 Claims, 6 Drawing Sheets

(52) U.S. Cl.
CPC .............. *H01M 2010/4271* (2013.01); *H01M 2010/4278* (2013.01); *H01M 2220/20* (2013.01)

(58) Field of Classification Search
CPC . H01M 2010/4271; H01M 2010/4278; H01M 2220/20; H01M 4/505; H02J 7/0036; H02J 7/0047; H04L 1/1671; H04L 2001/0093; Y02E 60/10; Y02T 10/70
See application file for complete search history.

(56) References Cited

U.S. PATENT DOCUMENTS

| | | | |
|---|---|---|---|
| 9,981,559 B2 | 5/2018 | Honda et al. | |
| 2010/0050033 A1 | 2/2010 | Chapman et al. | |
| 2011/0080138 A1* | 4/2011 | Nakanishi | H02J 7/0016 320/116 |
| 2011/0140669 A1 | 6/2011 | Murakami et al. | |
| 2012/0268069 A1* | 10/2012 | Park | H01M 10/425 320/116 |
| 2014/0203502 A1* | 7/2014 | Totani | B65H 31/32 271/220 |
| 2016/0325626 A1* | 11/2016 | Honda | B60L 3/12 |
| 2017/0012444 A1 | 1/2017 | Kamei | |
| 2019/0237816 A1 | 8/2019 | Kim et al. | |
| 2020/0200828 A1* | 6/2020 | Sung | H04B 17/318 |

FOREIGN PATENT DOCUMENTS

| | | |
|---|---|---|
| JP | 6439611 B2 | 12/2018 |
| KR | 10-1245279 B1 | 3/2013 |
| KR | 10-1333950 B1 | 11/2013 |
| KR | 10-2014-0073949 A | 6/2014 |
| KR | 10-2017-0116377 A | 10/2017 |
| KR | 10-2019-009635 A | 1/2019 |
| KR | 10-2019-0101286 A | 8/2019 |
| WO | 2015/121979 A1 | 8/2015 |
| WO | 2019/164203 A1 | 8/2019 |

OTHER PUBLICATIONS

Extended European Search Report dated May 19, 2022 issued by the European Patent Office in corresponding European Patent Application No. 20887495.8.
International Search Report issued in corresponding International Patent Application No. PCT/KR2020/015892, dated Feb. 19, 2021.
Office Action dated Oct. 29, 2024 issued in corresponding Korean Patent Application No. 10-2019-0146126 (Note: KR 10-1245279 B1, US 2016/0325626 A1, and KR 10-2019-0101286 A cited in this KR Office Action were cited in prior IDSs).

* cited by examiner

| ID | Gain value |
|---|---|
| $S_1$ | $A_1$ |
| $S_2$ | $A_2$ |
| $S_3$ | $A_3$ |
| ⋮ | ⋮ |
| $S_{N-1}$ | $A_{N-1}$ |
| $S_N$ | $A_N$ |

600

WIRELESS BATTERY MANAGEMENT SYSTEM, WIRELESS BATTERY MANAGEMENT METHOD AND ELECTRIC VEHICLE

TECHNICAL FIELD

The present disclosure relates to technology that uses wireless communication between a master and a plurality of slaves to manage a battery.

The present application claims the benefit of Korean Patent Application No. 10-2019-0146126 filed on Nov. 14, 2019 with the Korean Intellectual Property Office, the disclosure of which is incorporated herein by reference in its entirety.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

A battery pack for devices requiring high capacity and high voltage such as electric vehicles generally includes a plurality of battery modules connected in series. A management system having a multi slave system is disclosed to individually and efficiently manage the state of the plurality of battery modules. The management system having a multi slave system includes a plurality of slaves for monitoring the state of each battery module and a master to integratedly control the plurality of slaves.

However, when some slaves cannot respond to a command wirelessly transmitted from the master due to external noise, temporary malfunction or the like, the corresponding battery modules cannot be properly managed.

DISCLOSURE

Technical Problem

The present disclosure is aimed at enabling a master to identify each slave that did not send a response to a command wirelessly transmitted by the master, and wirelessly transmit the same command to each of the identified slaves again.

In addition, the present disclosure causes each slave to be reset by the slave's watchdog function to restore the wireless communication function when each slave does not receive a command wirelessly transmitted from the master for a predetermined time or longer.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A wireless battery management system according to an aspect of the present disclosure includes a master configured to wirelessly transmit a main command packet every reference time, and a plurality of slaves provided to monitor a state of a plurality of battery modules, each slave having a watchdog timer. Each slave is configured to wirelessly transmit a response packet including an ID of each slave when receiving the main command packet. The master is configured to scan the response packet from each slave during a threshold time from a time point at which the main command packet was transmitted. The master is configured to classify each slave to which the ID included in each response packet received within the threshold time is allocated as a first group, and each slave not classified as the first group as a second group. Each slave is configured to initialize a time count of the watchdog timer when receiving the main command packet. Each slave is configured to be reset by the watchdog timer when the time count of the watchdog timer reaches a timeout that is equal to or less than the reference time.

The master may be configured to wirelessly transmit a sub command packet including the ID of each slave classified as the second group. Each slave may be configured to wirelessly transmit the response packet when the sub command packet includes the ID of each slave.

Each slave may be configured to initialize the time count of the watchdog timer when receiving the sub command packet.

The master may be configured to determine an amplified signal strength based on a lowest ranked ID among the IDs of slaves each classified as the second group. The master may be configured to wirelessly transmit the sub command packet with the amplified signal strength.

Each slave may be configured to determine a relative rank of the ID of each slave among all the IDs included in the sub command packet. Each slave may be configured to wirelessly transmit the response packet at a time slot corresponding to the relative rank.

The master may be configured to classify each slave to which the ID included in each response packet received within the threshold time from a time point at which the sub command packet was transmitted is allocated as the first group from the second group.

The threshold time may be equal to or less than ½ of the reference time.

Each slave may be configured to increase a reference signal strength of each slave by a predetermined value each time each slave is reset by the watchdog timer. Each slave may be configured to wirelessly transmit the response packet with the increased reference signal strength.

An electric vehicle according to another aspect of the present disclosure include the wireless battery management system.

A wireless battery management method according to still another aspect of the present disclosure is executable by the wireless battery management system. The wireless battery management method includes wirelessly transmitting, by the master, the main command packet every reference time, scanning, by the master, the response packet from each slave during the threshold time from the time point at which the main command packet was transmitted, classifying, by the master, each slave to which the ID included in each response packet received within the threshold time is allocated as the first group, and each slave not classified as the first group as a second group, and wirelessly transmitting, by the master, the sub command packet including the ID of each slave classified as the second group. Each slave wireless transmits the response packet and initialize the time count of the watchdog timer when receiving the main command packet. Each slave is reset by the watchdog timer when the time count of the watchdog timer reaches the timeout. Each slave wireless transmits the response packet when the sub command packet includes the ID of each slave.

Advantageous Effects

According to at least one of the embodiments of the present disclosure, it is possible to enable the master to identify each slave that did not send a response to a command wirelessly transmitted from the master, and wirelessly transmit the same command to each of the identified slaves again.

In addition, according to at least one of the embodiments of the present disclosure, when each slave does not receive a command wirelessly transmitted from the master for a predetermined time or longer, each slave may be reset by the slave's watchdog function to restore the wireless communication function of each slave.

As a result, it is possible to reduce the frequency of failure of wireless connection between the master and the plurality of slaves and the time required for wireless connection of the master with all the slaves.

The effects of the present disclosure are not limited to the effects mentioned above, and these and other effects will be clearly understood by those skilled in the art from the appended claims.

BRIEF DESCRIPTION OF THE DRAWINGS S

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and this may be implemented by hardware and software either alone or in combination.

In addition, throughout the specification, it will be further understood that when an element is referred to as being "connected to" another element, it can be directly connected to the other element or intervening elements may be present.

Figure 1:
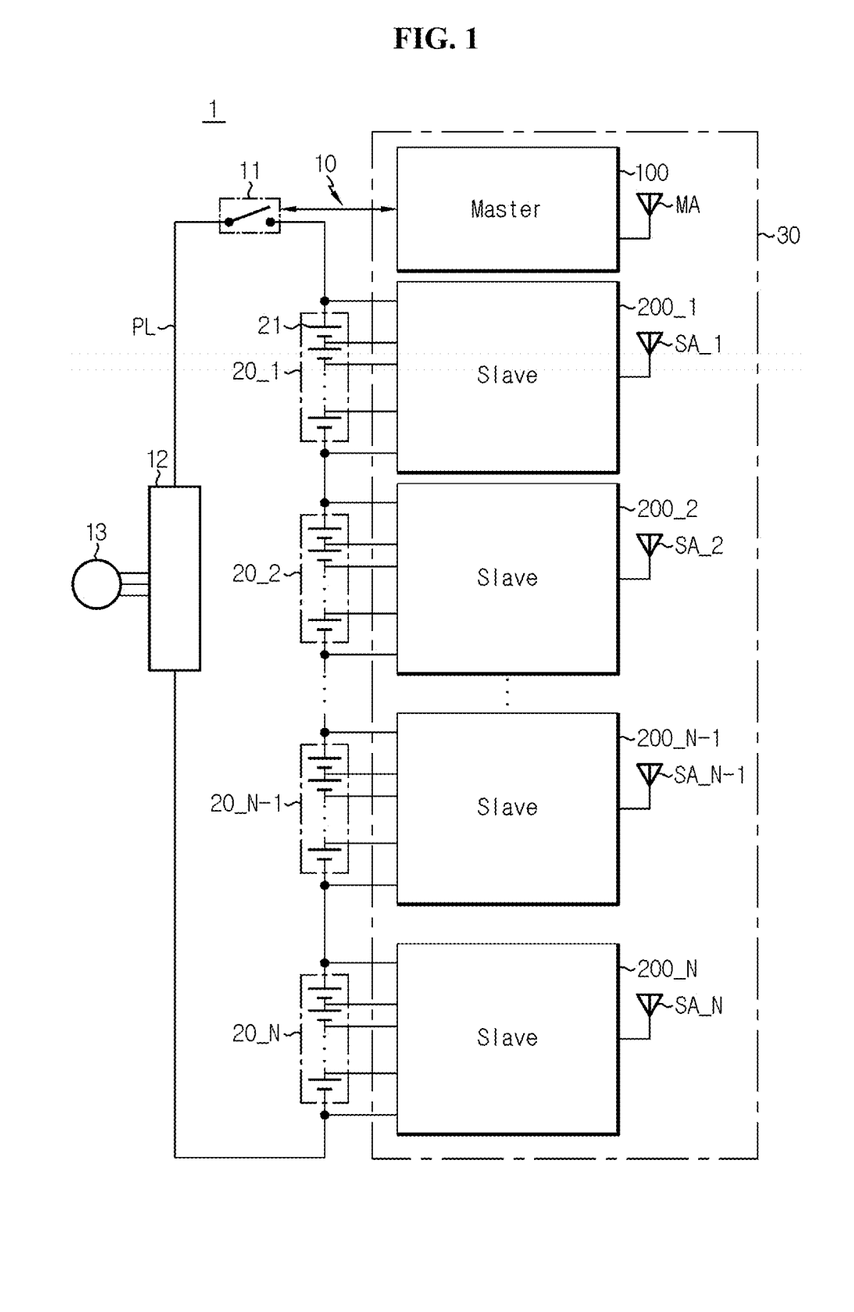
FIG. 1 is a diagram exemplarily showing a configuration of an electric vehicle including a wireless battery management system.

FIG. 1 is a diagram exemplarily showing a configuration of an electric vehicle 1 according to the present disclosure.

Referring to FIG. 1, the electric vehicle 1 includes a battery pack 10, a relay 11, an inverter 12 and an electric motor 13.

The battery pack 10 includes N battery modules 20 and a wireless battery management system 30. N is a natural of 2 or greater. In the drawing, to distinguish the N battery modules 20, the numbers 20_1~20_N are sequentially given to the N battery modules 20 in a descending order of potential. In describing the common elements between the N battery modules 20_1~20_N, the numbers 20 or 20_i are given. The battery pack 10 may supply power required to drive the electric motor 13 of the electric vehicle 1.

The relay 11 is installed on a power line PL connecting the battery pack 10 to the inverter 12. The relay 11 is controlled to be turned on/off in response to a switching signal from a master 100 of the wireless battery management system 30 (hereinafter referred to as 'system').

The inverter 12 is provided to convert the direct current from the battery pack 10 to an alternating current in response to a control signal from the system 30 while the relay 11 is in a turn-on state. The electric motor 13 is a 3-phase alternating motor, and works by the alternating current power generated by the inverter 12.

The N battery modules 20_1~20_N are connected in series and/or in parallel. The battery module 20 includes at least one battery cell 21. The battery cell 21 may be a lithium ion battery cell. The battery cell 21 includes any type of repeatedly rechargeable battery and is not limited to a particular type.

The system 30 includes the master 100 and N slaves 200. In the drawing, to distinguish the N slaves 200, the numbers 200_1~200_N are sequentially given to the N slaves 200. In describing the common elements between the N slaves 200_1~200_N, the numbers 200 or 200_i are given.

The master 100 is configured to integratedly control the battery pack 10 through wireless communication with the N slaves 200_1~200_N. Each of the plurality of slaves 200_1~200_N is configured to wirelessly communicate with the master 100 using the slave's ID pre-allocated from the master 100. The master 100 stores the IDs allocated to the plurality of slaves 200_1~200_N. The ID is identification information for distinguishing the plurality of slaves 200_1~200_N.

The master 100 may communicate with a vehicle controller of the electric vehicle 1 via a wired network such as Controller Area Network (CAN). The master 100 may wirelessly communicate with each slave 200 through an antenna MA.

The plurality of slaves 200_1~200_N is connected to a plurality of battery modules 20_1~20_N in a one-to-one relationship to collect and control battery information of the plurality of battery modules 20_1~20_N. Where i=1 N, the slave 200_i is configured to monitor the state (for example, voltage, current, temperature) of the battery module 20_i. The power required for the operation of the slave 200_i may be supplied from the battery module 20_i.

The slave 200_i may wirelessly transmit data (hereinafter referred to as 'battery information') indicating the monitored state (for example, voltage, temperature and so on) of the battery module 20_i to the master 100 in response to a command wirelessly transmitted from the master 100.

The master 100 may calculate the state of charge (SOC) and the state of health (SOH) of the battery module 20_i or determine whether overvoltage, undervoltage, overcharge or overdischarge occurred in the battery module 20_i based on the battery information from the slave 200_i.

The plurality of slaves 200_1~200_N is positioned at different areas in the battery pack 10 for different wireless communication distances from the master 100. The wireless communication distance between the slave 200_i and the master 100 may refer to a straight line distance between the antenna SA_i of the slave 200_i and the antenna MA of the master 100. Hereinafter, assume that the communication distance between the slave 200_i and the master 100 is shorter than the communication distance between the slave 200_i+1 and the master 100. For example, referring to FIG. 1, the antenna SA_i of the slave 200_i is positioned closer to the antenna MA of the master 100 than the antenna SA_i+1 of the slave 200_i+1. The antenna SA_i of the slave 200_i may be positioned on the 'upstream side' of the antenna SA_i+1 of the slave 200_i+1, and the antenna SA_i+1 of the slave 200_i+1 may be positioned on the 'downstream side' of the antenna SA_i of the slave 200_i.

Hereinafter, assume that a higher rank ID is allocated to a slave having a shorter wireless communication distance from the master 100. For example, the ID of the slave 200_i has a higher rank than the ID of the slave 200_i+1.

In the present disclosure, a 'command packet' is wirelessly transmitted by the master 100, and may be classified into a main command packet and a sub command packet.

The master 100 wirelessly transmits the main command packet every reference time. The reference time (for example, 1 sec) is preset, considering the number of slaves 200_1~200_N and the wireless communication distance from each slave 200. The main command packet may include information requesting the plurality of slaves 200_1~200_N to transmit the battery information of the plurality of battery modules 20_1~20_N to the master 100.

The master 100 is configured to perform the operation of classifying each of the plurality of slaves 200_1~200_N as a first group or a second group at least once for a standby period from the time point at which the master 100 transmitted the main command packet until the master 100 will transmit the next main command packet. The master 100 may scan a response packet from the second group during a threshold time (for example, 0.3 sec) from the time point at which the master 100 transmitted the main command packet.

When at least one of the plurality of slaves 200_1~200_N is classified as the second group, the master 100 may be configured to wirelessly transmit the sub command packet at least once within the standby period. The sub command packet is for inducing each slave 200 of the second group to wirelessly transmit the response packet.

When the sub command packet includes the ID of the slave 200, the slave 200 may be configured to wirelessly transmit the response packet as a response to the sub command packet to the master 100.

The master 100 classifies each slave 200 that wirelessly transmitted the response packet within the threshold time from the time point at which the sub command packet was transmitted as the first group from the second group. Each of the remaining slaves 200 of the second group is maintained as the second group.

Figure 2:
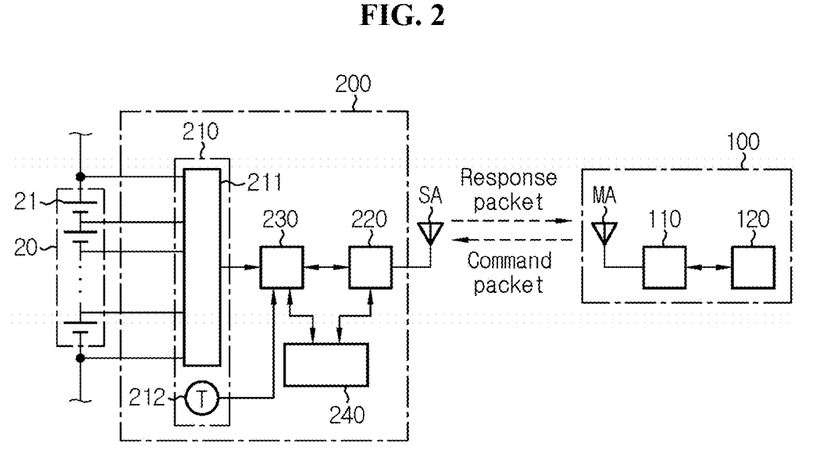
FIG. 2 is a diagram exemplarily showing a detailed configuration of a master and a slave of FIG. 1.

FIG. 2 is a diagram exemplarily showing the detailed configuration of the master 100 and the slave 200 of FIG. 1.

Referring to FIG. 2, the master 100 includes an antenna MA, a wireless communication circuit 110 and a control unit 120. The power required to operate the master 100 may be supplied from at least one of the plurality of battery modules 20_1~20_N or an external power source.

The wireless communication circuit 110 is configured to wirelessly transmit a command packet to the slave 200 through the antenna MA. Additionally, the wireless communication circuit 110 is configured to receive a response packet from the slave 200 through the antenna MA.

The control unit 120 is operably connected to the wireless communication circuit 110. The control unit 120 may determine a request for at least one of the plurality of slaves 200_1~200_N based on a signal (for example, indicating the battery information) received through the antenna MA, and wirelessly transmit the command packet including data indicating the request to at least one of the plurality of slaves 200_1~200_N.

The control unit 120 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions. The control unit 120 may have a memory device embedded therein, and the memory device may include, for example, RAM, ROM, register, hard disk, optical recording media or magnetic recording media. The memory device may store, update and/or erase programs including a variety of control logics executed by the control unit 120 and/or data created when the control logics are executed.

The slave 200 includes an antenna SA, a sensing unit 210, a wireless communication circuit 220 and a control unit 230. The slave 200 may further include a watchdog timer 240.

The sensing unit 210 includes a voltage measurement circuit 211 and a temperature sensor 212. The sensing unit 210 may further include a current sensor (not shown). The voltage measurement circuit 211 includes at least one voltage sensor.

The voltage measurement circuit 211 measures a module voltage of the battery module 20. The module voltage is a voltage across the battery module 20. The voltage measurement circuit 211 may further measure a cell voltage of each battery cell 21 included in the battery module 20. The cell voltage is a voltage across the battery cell 21. The voltage measurement circuit 211 transmits a voltage signal indicating the module voltage and the cell 21 voltage to the control unit 230.

The temperature sensor 212 is positioned at a predetermined distance from the battery module 20 to transmit a temperature signal indicating the temperature of the battery module 20 to the control unit 230.

The current sensor is installed on a charge/discharge current path of the battery pack 10 to measure an electric current flowing during the charge/discharge of the battery pack 10, and transmit a current signal indicating the measured current to the control unit 230.

The wireless communication circuit 220 is connected to the control unit 230 and the antenna SA. The wireless communication circuit 220 may be implemented in hardware using RF System on Chip (SoC). The wireless communication circuit 220 may wirelessly transmit data to the master 100 or other slave 200 or wirelessly receive data from the master 100 or other slave 200 through the antenna SA.

The control unit 230 may be operably coupled to the sensing unit 210 and the wireless communication circuit 220 to individually control the operation of each of the sensing unit 210 and the wireless communication circuit 220. The control unit 230 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other function. The control unit 230 may have a memory device embedded therein, and the memory device may include, for example, RAM, ROM, register, hard disk, optical recording media or magnetic recording media. The memory device may store, update and/or erase programs including a variety of control logics executed by the control unit 230 and/or data created when the control logics are executed.

The wireless communication circuit 220 is configured to selectively perform at least one of preset functions in response to a signal from the master 100 or other slave 200 wirelessly received through the antenna SA.

When a signal is received through the antenna SA, the wireless communication circuit 220 may measure the signal strength of the received signal. When the command packet is received from the master 100 through the antenna SA, the wireless communication circuit 220 may wirelessly transmit the response packet as a response to the command packet to the master 100. The response packet is a signal for reporting that the slave 200 succeeded to receive the command packet wirelessly transmitted from the master 100 to the master 100. The response packet includes battery information required by the command packet.

The watchdog timer 240 is operably coupled to the control unit 230 and/or the wireless communication circuit 220. The watchdog timer 240 is provided to repeatedly monitor whether the slave 200 is malfunctioning.

The control unit 230 outputs an initialization signal to the watchdog timer 240 in response to the reception of the command packet. A time count of the watchdog timer 240 is initialized by the initialization signal. The time count of the watchdog timer 240 indicates a period of time that has passed from the time at which the time count was initialized last.

In a situation where the command packet from the master 100 cannot be received by the slave 200 due to a malfunction of the control unit 230 and/or the wireless communication circuit 220, the time count may reach a timeout. The watchdog timer 240 outputs a rest signal to the control unit 230 and/or the wireless communication circuit 220 each time the time count reaches a predetermined timeout.

The timeout may be equal to or less than the reference time or the threshold time. Accordingly, when the command packet from the master 100 is not received by the control unit 230 for the standby period, the watchdog timer 240 outputs the reset signal at least once for the standby period.

The slave 200 is reset by the reset signal. Resetting the slave 200 may refer to resetting the control unit 230 and/or the wireless communication circuit 220. Each time the slave 200 is reset by the watchdog timer 240, the control unit 230 may increase the reference signal strength for wireless transmission of the response packet by a predetermined value.

Figure 3:
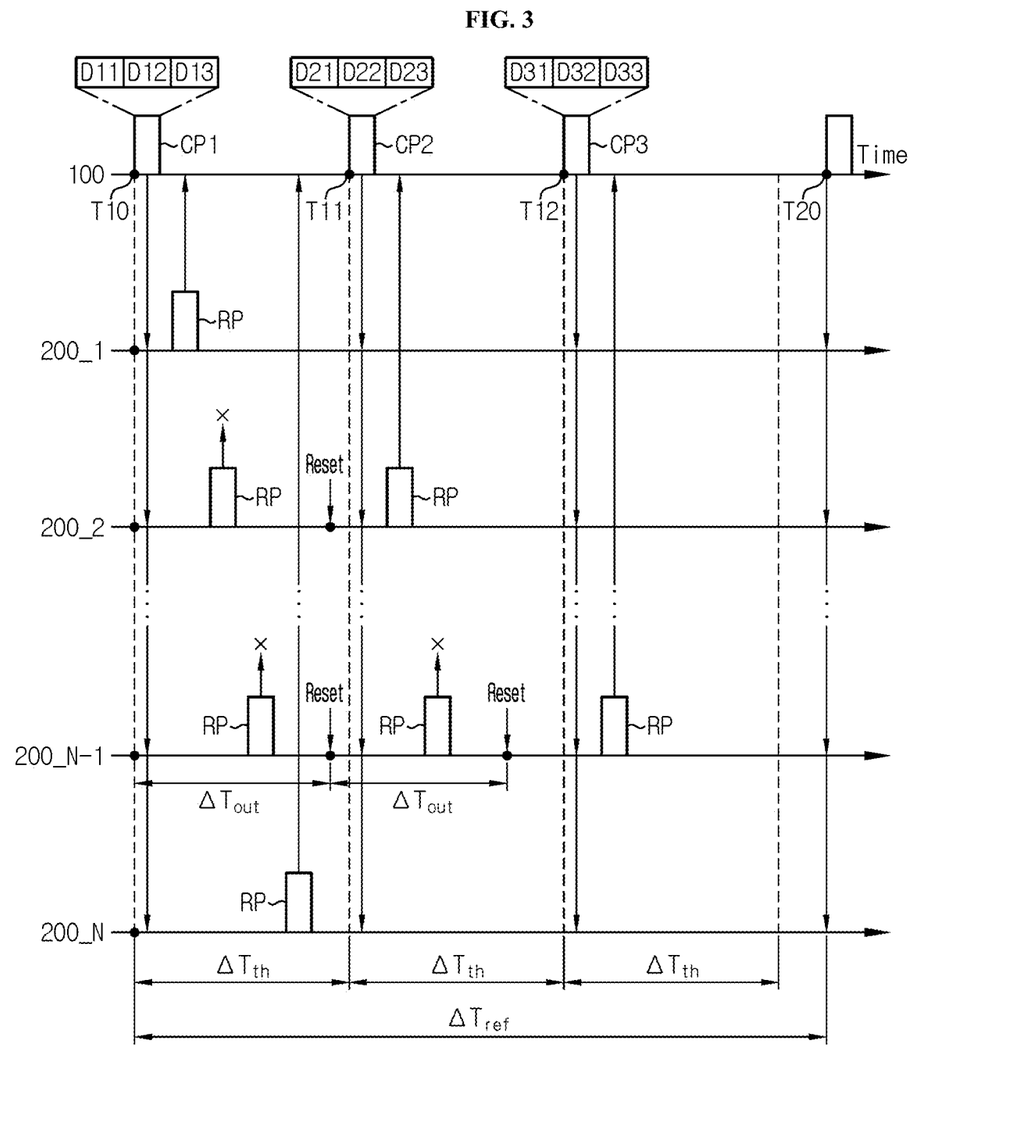
FIG. 3 is a timing chart for describing a process of collecting battery information through wireless communication of a master of FIG. 1 with a plurality of slaves.

FIG. 3 is a timing chart for describing a process of collecting the battery information through wireless communication of the master 100 of FIG. 1 with the plurality of slaves 200_1~200_N.

In FIG. 3, a time point T10 denotes a start time of a cycle, a time point T20 denotes a start time of the next cycle, $\Delta T_{ref}$ denotes the reference time, $\Delta T_{th}$ denotes the threshold time, and $\Delta T_{out}$ denotes the timeout. $\Delta T_{ref}$ or $\Delta T_{th}$ is divided into N or more time slots, and among them, assume that N time slots are sequentially allocated to the plurality of slaves 200_1~200_N.

The threshold time $\Delta T_{th}$ may be equal to or less than ½ of the reference time $\Delta T_{ref}$. In FIG. 3, the threshold time $\Delta T_{th}$ is ¼~⅓ of the reference time $\Delta T_{ref}$, and the timeout $\Delta T_{out}$ is shorter than the threshold time $\Delta T_{th}$.

At the time point T10, the master 100 wirelessly transmits a main command packet CP1 to the plurality of slaves 200_1~200_N. The master 100 may wirelessly transmit the main command packet CP1 with a predetermined first signal strength. The main command packet CP1 may be transmitted to the plurality of slaves 200_1~200_N simultaneously through a broadcasting method. The main command packet CP1 may include first data D11 and second data D12, and may further include third data D13. The first data D11 indicates whether or not the corresponding command packet was initially transmitted by the master 100 at the current cycle (i.e., whether the corresponding command packet is a main command packet or a sub command packet). For example, the first data D11 being a first value (for example, 0) indicates that the corresponding command packet is a main command packet. The second data D12 includes a request for the plurality of slaves 200_1~200_N. The request is for requesting a slave belonging to the second group to perform a specific function (for example, voltage measurement, cell balancing). The third data D13 includes the IDs of all of the plurality of slaves 200_1~200_N.

Each of the plurality of slaves 200_1~200_N wirelessly transmits the response packet RP at the time slot allocated to each slave 200_1~200_N when wirelessly receiving the main command packet CP1. That is, where i=1~N, the slave 200_i wirelessly transmits the response packet RP at the $i^{th}$ time slot among N or more time slots.

The master 100 scans the response packet RP from the plurality of slaves 200_1~200_N during the threshold time $\Delta T_{th}$ from the time point T10.

Assume that the master 100 received the response packet RP from the slave 200_1, 200_3~200_N-2, 200_N within the threshold time $\Delta T_{th}$ from the time point T10, but did not receive the response packet RP from the slave 200_2, 200_N-1.

Then, the master 100 may set the slaves 200_1, 200_3~200_N-2, 200_N to which the IDs included in the response packet RP are allocated as the first group, and the remaining slaves 200_2, 200_N-1 as the second group.

When the timeout $\Delta T_{out}$ is equal to or less than the threshold time $\Delta T_{th}$, each of the slaves 200_2, 200_N-1 of the second group may be reset by the watchdog timer 240 before a time point T11.

At the time point T11, only two slaves 200_2, 200_N-1 are set as the second group. At the time point T11, the master 100 wirelessly transmits a sub command packet CP2. The sub command packet CP2 may include first data D21, second data D22 and third data D23. The first data D21 has a second value (for example, 1), and this indicates that the corresponding command packet is the sub command packet for requesting the response packet of the second group. The second data D22 includes a request for the slave 200_2, 200_N-1 of the second group. The third data D23 includes the ID of each of the slaves 200_2, 200_N-1 of the second group.

Since the sub command packet CP2 includes only the IDs of the two slaves 200_2, 200_N-1 belonging to the second group, the slaves 200_1, 200_3~200_N-2, 200 N classified as the first group may not respond to (ignore) the sub command packet CP2. For example, the slaves 200_1, 200_3~200_N-2, 200 N may erase the sub command packet CP2 from their memory devices.

In contrast, when receiving the sub command packet CP2, each slave 200_2, 200_N-1 of the second group may determine a relative rank of the slave's ID to all the IDs included in the sub command packet CP2. The slave 200_2 determines the rank of the slave's ID as highest since there is no ID having a higher rank than the ID of slave 200_2 among all the IDs included in the third data D23. The slave 200_N-1 may determine the slave's ID as second highest since only one of the IDs included in the third data D23 has a higher rank than the ID of the slave 200_N-1.

The slave 200_2 wirelessly transmits the response packet RP at a timing (for example, the first time slot) associated with the relative rank of the ID of the slave 200_2. The slave 200_N-1 wirelessly transmits the response packet RP including the ID of the slave 200_N-1 at the timing (for example, the second time slot) associated with the relative rank of the slave's ID.

During the threshold time $\Delta T_{th}$ from the time point T11, the master 100 scans the response packet RP from the slave 200_2, 200_N-1 of the second group. Assume that the master 100 received the response packet RP from the slave 200_2, but did not receive the response packet RP from the slave 200_N-1, within the threshold time $\Delta T_{th}$ from the time point T11. Then, the master 100 sets the slave 200_2 as the first group from the second group, while maintains the slave 200_N-1 as the second group.

The slave 200_N-1 of the second group is reset by the watchdog timer 240 before a time point T12.

At the time point T12, the master 100 wirelessly transmits a sub command packet CP3. The sub command packet CP3 may include first data D31, second data D32 and third data D33. The first data D31 of the sub command packet CP3 may have a second value. The second data D32 includes a request for the slave 200_N-1 of the second group. The third data D33 includes the ID of the slave 200_N-1 of the second group.

Since the sub command packet CP3 includes only the ID of the slave 200_N-1 of the second group, the slave 200_1~200_N-2, 200_N set as the first group may ignore the sub command packet CP3. The slave 200_N-1 may determine a relative rank of the slave's ID to all the IDs included in the sub command packet CP3. Since the third data D33 includes only the ID of the slave 200_N-1, the slave 200_N-1 determines the rank of the slave's ID as highest. Accordingly, the slave 200_N-1 transmits the response packet RP to the master 100 at the timing (for example, the first time slot) associated with the relative rank of the slave's ID.

During the threshold time $\Delta T_{th}$ from the time point T12, the master 100 scans the response packet RP from the slave 200_N-1 of the second group. When the master 100 receives the response packet RP from the slave 200_N-1 within the threshold time $\Delta T_{th}$ from the time point T12, the master 100 classifies the slave 200_N-1 as the first group from the second group. Then, since the number of members of the second group is 0, the master 100 does not wirelessly transmit an additional sub command packet and stands by before the time point T20 arrives.

Meanwhile, the slave 200 may wirelessly transmit the response packet RP with a predetermined second signal strength. Alternatively, each slave 200 may wirelessly transmit the response packet RP with the slave's reference signal strength. For example, for the slave 200_i-1, when the number of times the slave 200_i-1 was reset is x, the reference signal strength of the slave 200_i-1 may equal the sum of a product obtained by multiplying a predetermined value by x and the predetermined second signal strength.

Figure 4:
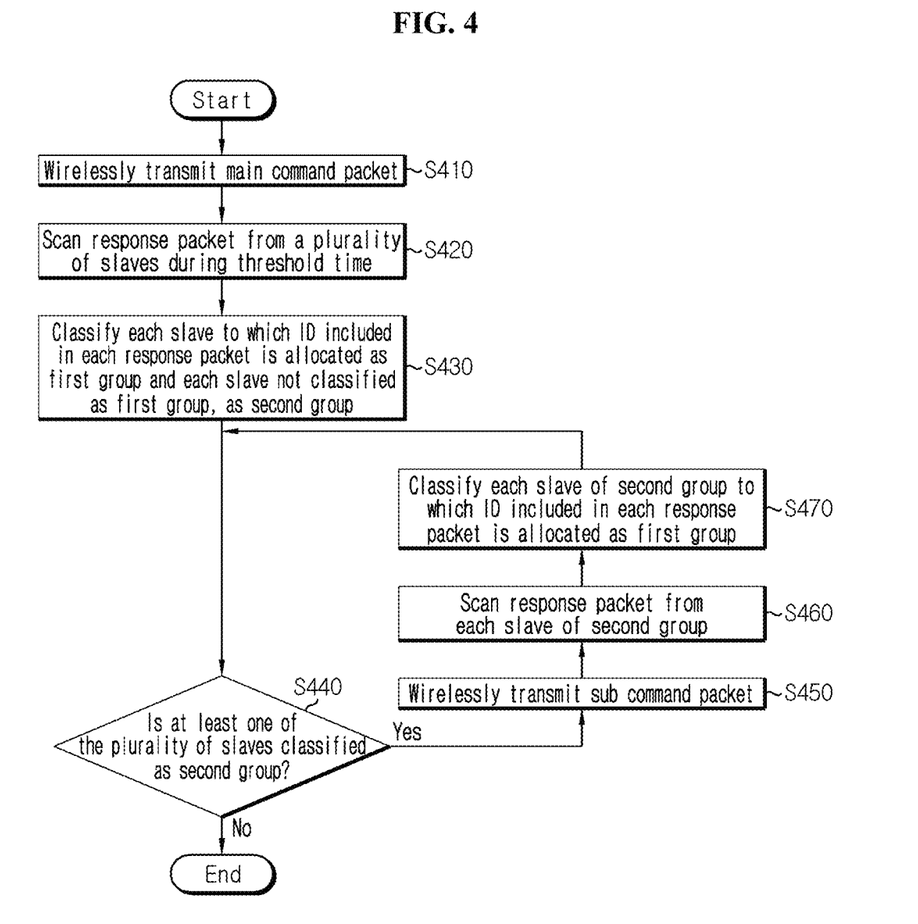
FIG. 4 is a flowchart showing a wireless battery management method according to a first embodiment of the present disclosure.

FIG. 4 is a flowchart showing a wireless battery management method according to a first embodiment of the present disclosure. The method of FIG. 4 may be performed every reference time $\Delta T_{ref}$.

Referring to FIGS. 1 to 4, in step S410, the master 100 wirelessly transmits the main command packet CP1. The main command packet CP1 may be wirelessly transmitted with the predetermined first signal strength. When receiving the main command packet CP1, each slave 200 may wirelessly transmit the response packet RP including the slave's ID with the predetermined second signal strength or the slave's reference signal strength. When receiving the main command packet CP1, each slave 200 may initialize the time count of the watchdog timer 240 provided in the slave 200.

In step S420, the master 100 scans the response packet RP from the plurality of slaves 200_1~200_N during the threshold time $\Delta T_{th}$.

In step S430, the master 100 classifies each slave 200 to which the ID included in each response packet RP received within the threshold time $\Delta T_{th}$ is allocated as the first group, and each slave 200 not classified as the first group as the second group.

In step S440, the master 100 determines whether at least one of the plurality of slaves 200_1~200_N is classified as the second group. When a value of the step S440 is "Yes", step S450 is performed. When the value of the step S440 is "No", the method may end.

In step S450, the master 100 wirelessly transmits the sub command packet CP2 including the ID of each slave 200 classified as the second group. The sub command packet CP2 may be wirelessly transmitted with the predetermined first signal strength. Each slave 200 of the second group wirelessly transmits the response packet RP including the slave's ID with the predetermined second signal strength or the slave's reference signal strength when receiving the sub command packet CP2.

In step S460, the master 100 scans the response packet RP from each slave 200 of the second group during the threshold time $\Delta T_{th}$.

In step S470, the master 100 classifies each slave 200 of the second group to which the ID included in each response packet RP received within the threshold time $\Delta T_{th}$ is allocated as the first group. Each of the remaining slaves 200 of the second group is maintained as the second group. After the step S470, the method may move to the step S440.

Figure 5:
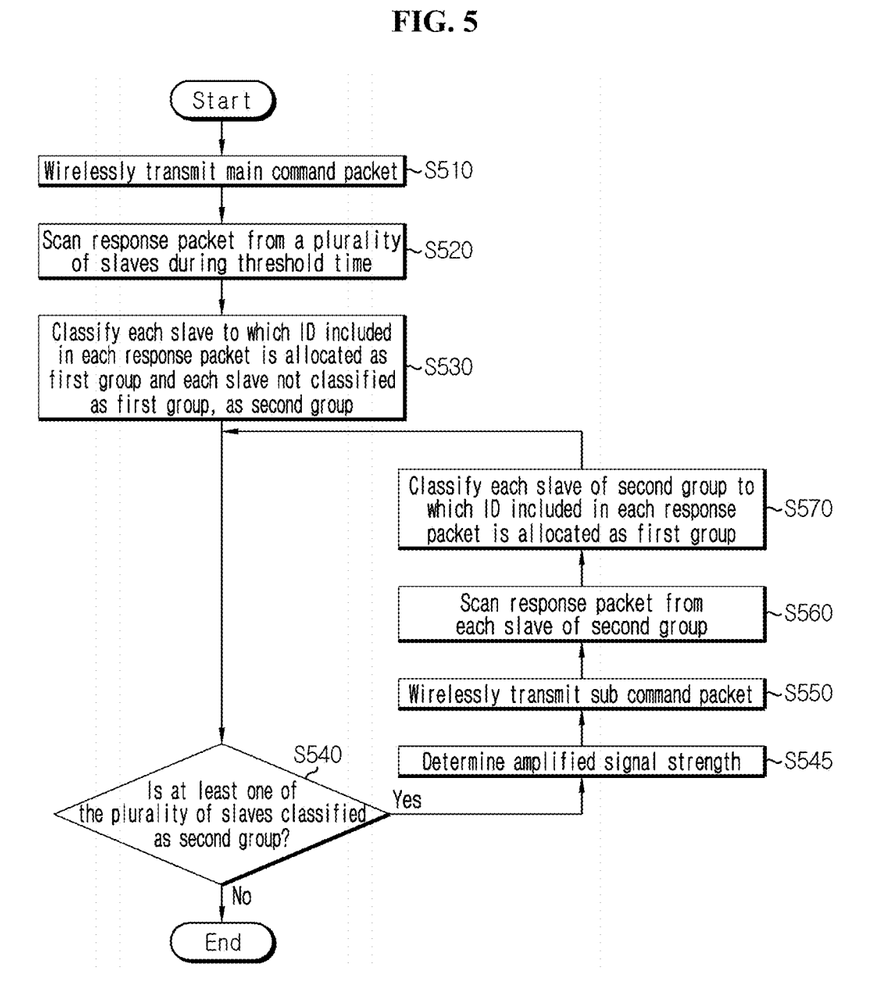
FIG. 5 is a flowchart showing a wireless battery management method according to a second embodiment of the present disclosure.
Figure 6:
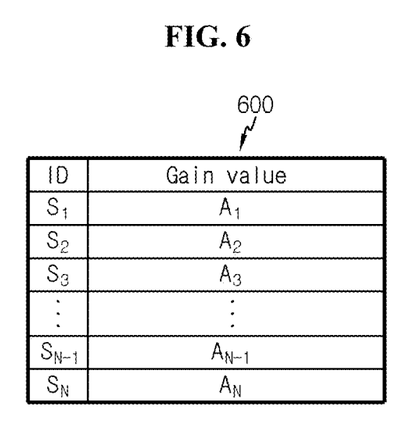
FIG. 6 is a diagram exemplarily showing a look up table for the second embodiment.

FIG. 5 is a flowchart showing a wireless battery management method according to a second embodiment of the present disclosure, and FIG. 6 shows a look up table for the second embodiment. The method of FIG. 5 may be performed every reference time $\Delta T_{ref}$.

Referring to FIGS. 1 to 3, 5 and 6, in step S510, the master 100 wirelessly transmits the main command packet CP1. The main command packet CP1 may be wirelessly transmitted with the predetermined first signal strength. When receiving the main command packet CP1, each slave 200 may wirelessly transmit the response packet RP including the slave's ID with the predetermined second signal strength or the slave's reference signal strength. When receiving the main command packet CP1, each slave 200 may initialize the time count of the watchdog timer 240 provided in the slave 200.

In step S520, the master 100 scans the response packet RP from the plurality of slaves 200_1~200_N during the threshold time $\Delta T_{th}$.

In step S530, the master 100 classifies each slave 200 to which the ID included in each response packet RP received within the threshold time $\Delta T_{th}$ is allocated as the first group, and each slave 200 not classified as the first group as the second group.

In step S540, the master 100 determines whether at least one of the plurality of slaves 200_1~200_N is classified as the second group. When a value of the step S540 is "Yes", step S545 is performed. When the value of the step S540 is "No", the method may end.

In step S545, the master 100 determines an amplified signal strength. In detail, the master 100 determines a gain value from the look up table 600 based on the lowest ranked ID among the IDs of all the slaves 200 classified as the second group. The look up table 600 stores a plurality of gain values $A_1$~$A_N$ associated with the IDs $S_1$~$S_N$ of the plurality of slaves 200_1~200_N in a one-to-one relationship. The minimum value of the plurality of gain values $A_1$~$A_N$ is greater than 1. In the look up table 600, a larger gain value is associated with a lower ranked ID. That is, $A_1 < A_2, \ldots A_{N-1} < A_N$. For example, as shown in FIG. 3, when the slave 200_2 and the slave 200_N−1 belong to the second group, the lowest ranked ID is $S_{N-1}$, and thus $A_{N-1}$ determined as the gain value, and the amplified signal strength is determined to be equal to the multiplication of the predetermined first signal strength by the gain value $A_{N-1}$.

In step S550, the master 100 wirelessly transmits the sub command packet CP2 including the ID of each slave 200 classified as the second group. The sub command packet CP2 may be wirelessly transmitted with the amplified signal strength determined in the step S545. Each slave 200 of the second group wirelessly transmits the response packet RP including the slave's ID with the predetermined second signal strength or the slave's reference signal strength when receiving the sub command packet CP2.

In step S560, the master 100 scans the response packet RP from each slave 200 of the second group during the threshold time $\Delta T_{th}$.

In step S570, the master 100 classifies each slave 200 of the second group to which the ID included in each response packet RP received within the threshold time $\Delta T_{th}$ is allocated as the first group. Each of the remaining slaves 200 of the second group is maintained as the second group. After the step S570, the method may move to the step S540.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A wireless battery management system, comprising:
a master configured to wirelessly transmit a main command packet at a reference time interval; and
a plurality of slaves provided to monitor a state of a plurality of battery modules, respectively, each slave including a corresponding watchdog timer and being configured to wirelessly transmit a corresponding response packet including a corresponding ID when receiving the main command packet,
wherein the master is further configured to:
scan for the response packet from each of the plurality of slaves during a threshold time following the master's transmission of the main command packet; and
classify:
each slave from which the corresponding ID included in the corresponding response packet is received within the threshold time, among the plurality of slaves, as a first group, and
each slave not classified as the first group, among the plurality of slaves, as a second group, and
wherein each of the plurality of slaves is further configured to:
initialize a time count of the corresponding watchdog timer when receiving the main command packet; and
be reset by the corresponding watchdog timer when the time count of the corresponding watchdog timer reaches a timeout that is equal to or less than the reference time interval.

2. The wireless battery management system according to claim 1, wherein if at least one slave, among the plurality of slaves, is classified as the second group:
the master is further configured to wirelessly transmit a sub command packet including the corresponding ID of each of the at least one slave classified as the second group; and
each respective slave, among the at least one slave classified as the second group, is further configured to wirelessly transmit the corresponding response packet when the sub command packet includes the corresponding ID of the respective slave classified as the second group.

3. The wireless battery management system according to claim 2, wherein each of the at least one slave classified as the second group is further configured to initialize the time count of the corresponding watchdog timer when receiving the sub command packet.

4. The wireless battery management system according to claim 2, wherein the master is further configured to:
   determine an amplified signal strength based on a lowest ranked corresponding ID among the corresponding IDs respectively of the at least one salve classified as the second group; and
   wirelessly transmit the sub command packet with the amplified signal strength.

5. The wireless battery management system according to claim 2, wherein each respective slave, among the at least one slave classified as the second group, is further configured to:
   determine a relative rank of the corresponding ID of the respective slave among the corresponding IDs of the at least one slave classified as the second group included in the sub command packet; and
   wirelessly transmit the corresponding response packet at a time slot corresponding to the relative rank.

6. The wireless battery management system according to claim 2, wherein the master is further configured to reclassify as the first group each slave, among the at least one slave previously classified as the second group, from which the corresponding ID included in the corresponding response packet is received within the threshold time following the master's transmission of the sub command packet.

7. The wireless battery management system according to claim 1, wherein the threshold time is less than or equal to ½ of the reference time interval.

8. The wireless battery management system according to claim 1, wherein each slave, among the plurality of slaves, is further configured to:
   increase a reference signal strength of itself by a predetermined value each time it is reset by the corresponding watchdog timer; and
   wirelessly transmit the corresponding response packet with the increased reference signal strength.

9. An electric vehicle comprising the wireless battery management system according to claim 1.

10. A wireless battery management method executable by the wireless battery management system according to claim 1, the method comprising:
   wirelessly transmitting, by the master, the main command packet at the reference time interval;
   scanning, by the master, for the corresponding response packet from each of the plurality of slaves during the threshold time following the master's transmission of the main command packet;
   classifying, by the master:
      each slave from which the corresponding ID included in the corresponding response packet is received within the threshold time, among the plurality of slaves, as the first group; and
      each slave not classified as the first group, among the plurality of slaves, as the second group; and
   if at least one slave, among the plurality of slaves, is classified as the second group, wirelessly transmitting, by the master, a sub command packet including the corresponding ID of each of the at least one slave classified as the second group,
   wherein each respective slave among the plurality of slaves:
      wirelessly transmits the corresponding response packet and initializes the time count of the corresponding watchdog timer when receiving the main command packet,
      is reset by the corresponding watchdog timer when the time count of the corresponding watchdog timer reaches the timeout, and
      wirelessly transmits the corresponding response packet when the sub command packet includes the corresponding ID of the respective slave.

* * * * *